R. W. REQUA.
COMBINED FISH SCREEN AND DEBRIS REMOVER.
APPLICATION FILED FEB. 24, 1915.
1,252,617.
Patented Jan. 8, 1918.
4 SHEETS—SHEET 1.
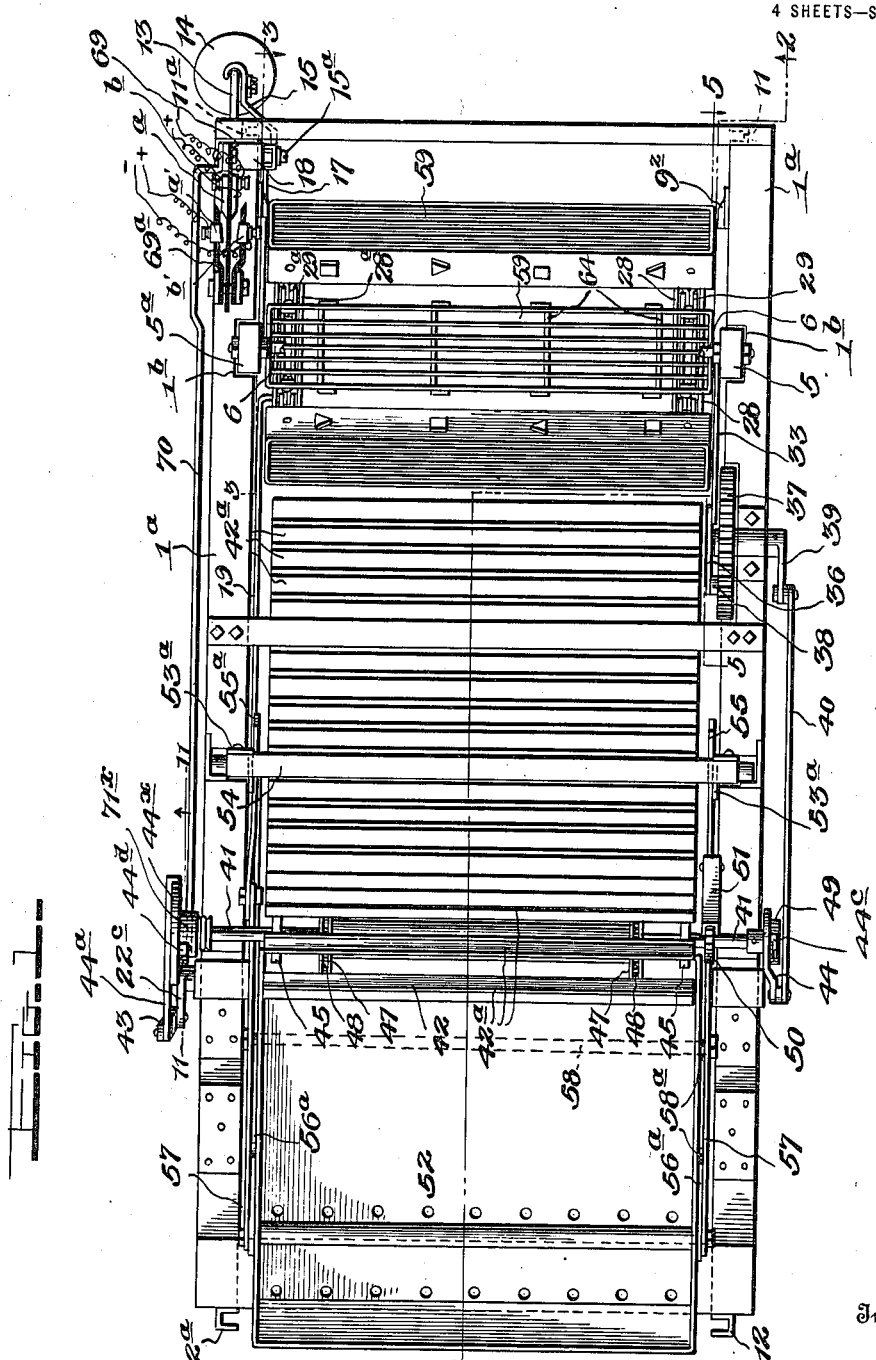

R. W. REQUA.
COMBINED FISH SCREEN AND DEBRIS REMOVER.
APPLICATION FILED FEB. 24, 1915.
1,252,617.
Patented Jan. 8, 1918.
4 SHEETS—SHEET 2.
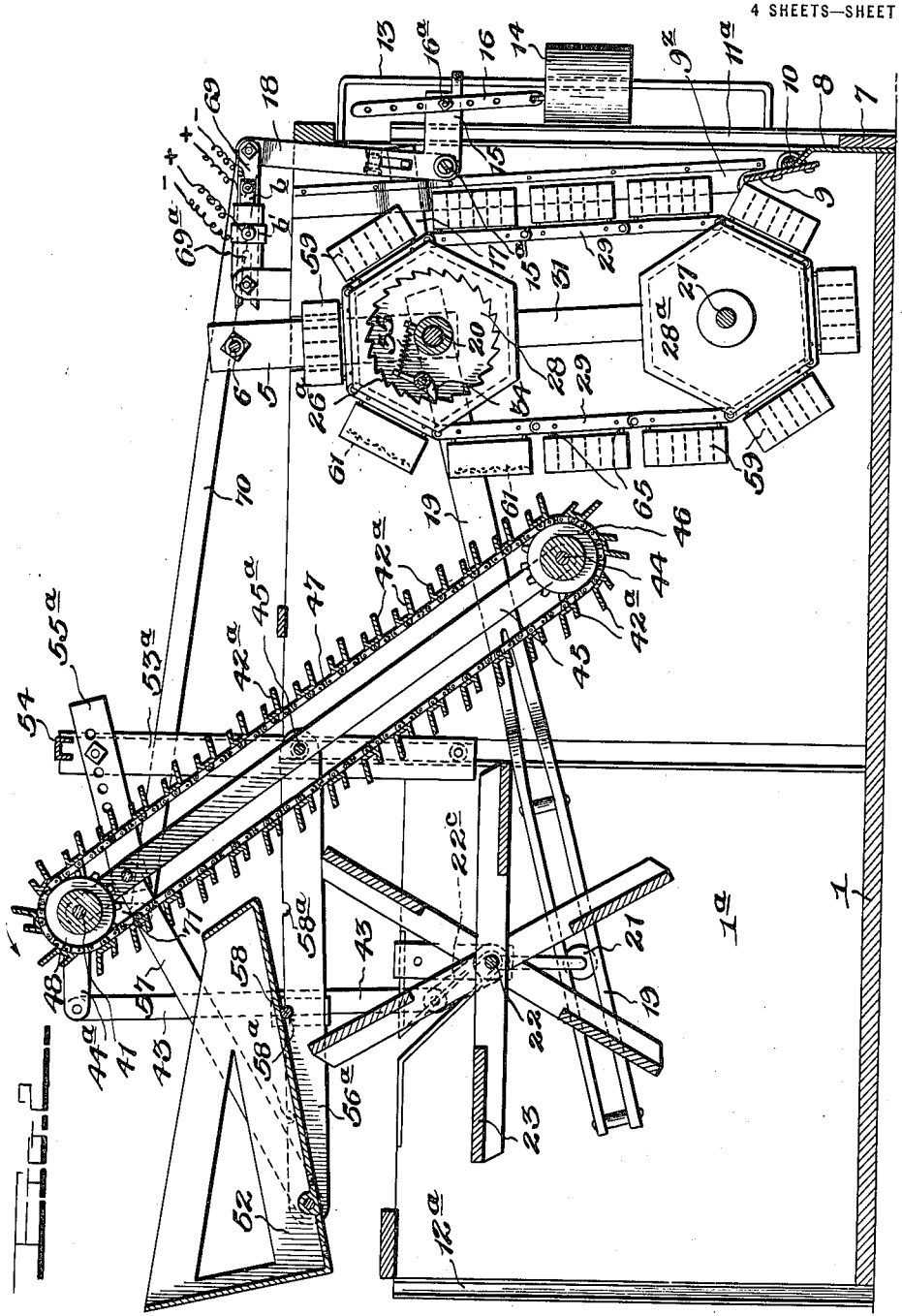
Witnesses
Chas. L. Griesbauer.
W. Wallace Nairn Jr
Ralph W. Requa INVENTOR.
By Sowell & Sowell
Attorneys

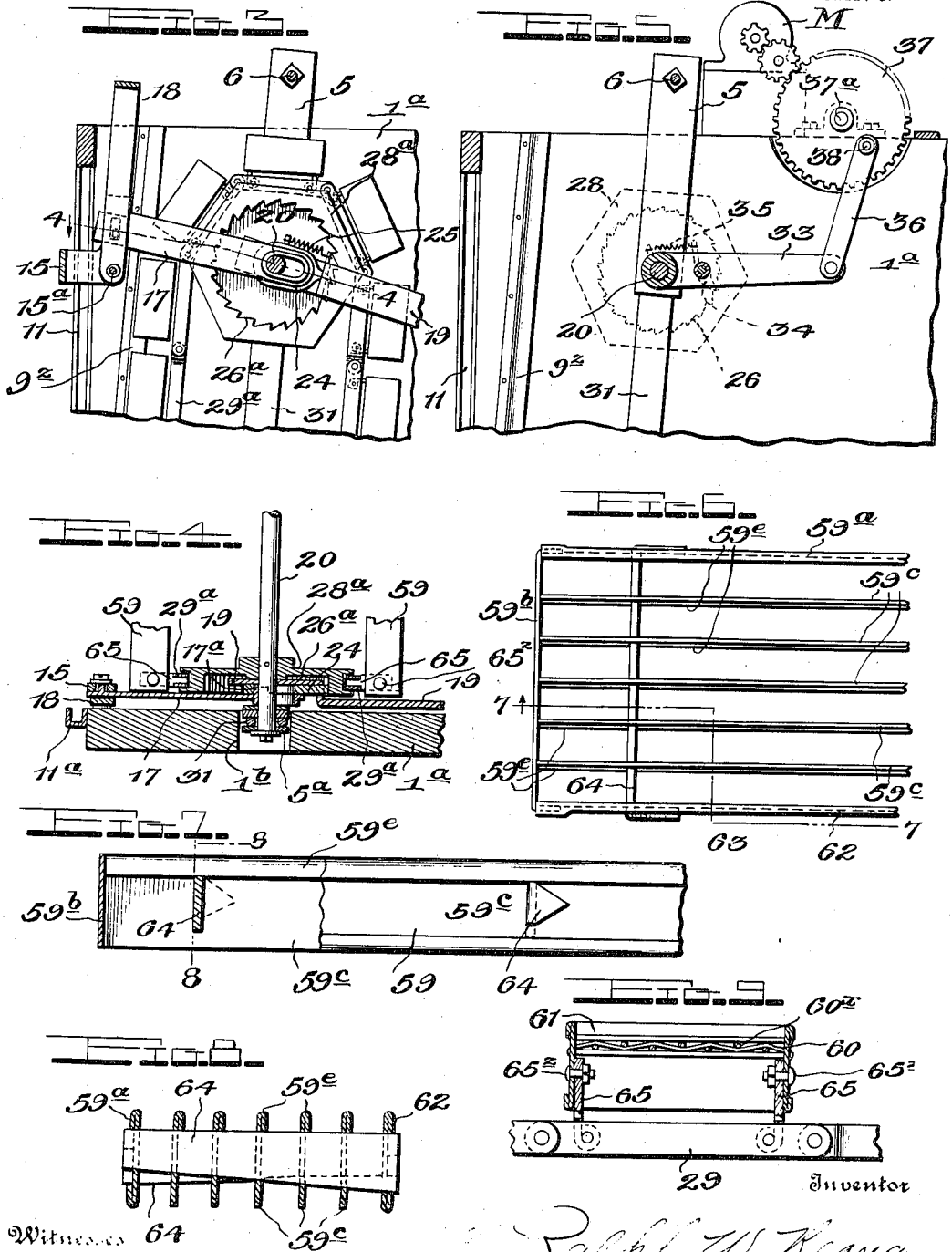

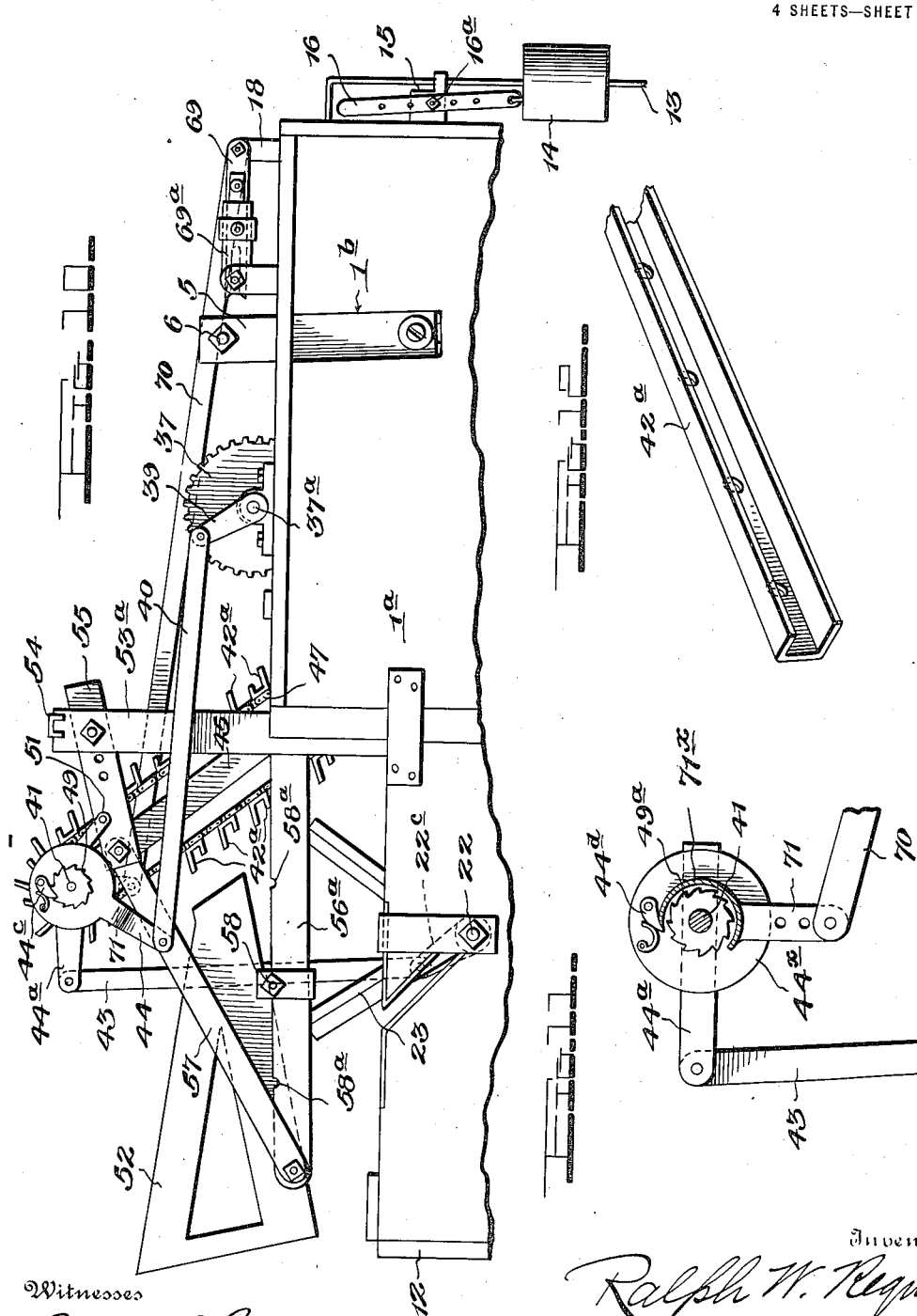

UNITED STATES PATENT OFFICE.

RALPH WALDO REQUA, OF CHICO, CALIFORNIA.

COMBINED FISH-SCREEN AND DEBRIS-REMOVER.

1,252,617.   Specification of Letters Patent.   Patented Jan. 8, 1918.

Application filed February 24, 1915. Serial No. 10,270.

*To all whom it may concern:*

Be it known that I, RALPH W. REQUA, a citizen of the United States, residing at Chico, in the county of Butte and State of California, have invented certain new and useful Improvements in Combined Fish-Screens and Debris-Removers; and I hereby declare that the following is a full, clear, and exact description thereof, reference being had to the accompanying drawings, which form part of this specification.

This invention is a combined fish screen and debris remover; and its primary object is to provide a fish screen of improved design and novel construction, with a novel elevating device, which works in conjunction and in unison with the screen, and will remove heavy floating debris, such as wood, grass, bark, and other large floatage matter from the water, and deposit it in a receptacle provided for the purpose.

It has long been the desire of fish men and engineers having waterways or other artificial diversion of water to screen, to obtain a suitable and efficient screen section that would not restrict the flow of water through the same. The importance of such a screen is that nearly all of the intakes of canals, headworks of ditches, pipe lines, etc., are already constructed and in operation. The diverting dam and headgates were built to handle the water at a grade that did not take into consideration any possible backing up of the water in the headworks by inserting any sort of fish screening device. While any kind of coarse rack would hold back the larger pieces of floatage matter the laws governing the screening of these waterways provide that the openings or spaces shall be "not over ¼ inch apart." This is to keep the small fish from entering the canal, etc., as well as the larger ones, therefore it can be readily seen that it is of the utmost importance to provide a screen that presents the least possible resistance to the ordinary flow of water through the same.

A further object of the invention is to so construct the screen and the debris remover that they may be used at the intakes of large pipe lines, penstocks, canals, and wherever it is necessary or desirable to use an effective screen and means for automatically removing the debris collected by the screen, thereby preventing injury or destruction of the power members, and preventing clogging of the screen.

A further object of the invention is to provide a sectional screen, each section thereof being changeable and removable without interfering with the remaining sections.

A further object of the invention is to construct each screen section in a novel manner, and to have the screen bars horizontally disposed, which permits of making the opening or distance between the bars of double the width of spaces between bars arranged in a perpendicular manner, whereby the screen is enhanced in efficiency as fish can pass through narrow perpendicularly disposed slots or orifices while unable to pass through horizontally disposed slots or openings of greater width. My novel construction of screen sections enables me to reduce the number of bars required in a given sized screen section about one half, with a corresponding saving in weight and cost of material.

A further object of the invention is to provide means for operating both the screen and debris remover with an intermittent movement and to operate them alternately if desired; and a further object is to provide means for automatically regulating their operation.

I will explain the invention as embodied in the apparatus illustrated in the accompanying drawings, in which—

Figure 1 is a top plan view of the complete apparatus.

Fig. 2 is a longitudinal vertical section through such apparatus on the line 2—2, Fig. 1.

Fig. 3 is a detail section on line 3—3, Fig. 1.

Fig. 4 is a detail section on line 4—4, Fig. 3.

Fig. 5 is a detail section on line 5—5, Fig. 1, looking in the direction of the arrows.

Fig. 6 is a detail view of one of the screen members.

Fig. 7 is a section on line 7—7, Fig. 6.

Fig. 8 is a transverse section on line 8—8, Fig. 7.

Fig. 9 is a transverse section through a modified screen member.

Fig. 10 is a detail side elevation of the upper part of the apparatus looking at the lower side of Fig. 1.

Fig. 11 is a detail.

Fig. 12 is a detail view of one of the elevator bars.

1 designates the bottom and 1ᵃ the side walls of the intake of a penstock, canal, or other fluid channel that is to be screened. At the inlet end of this channel are provided novel screening and debris removing devices. The screen comprises a series of members arranged in an endless chain and means for moving said members orbitally in a vertical plane. As shown the screen is mounted in a frame comprising opposite side members 31 Fig. 2, in which are journaled shafts 20 and 27; upon which are mounted polygonal sprockets 28 and 28$^a$ which are preferably grooved to carry endless chains 29 and 29$^a$. To these chains are attached the screen sections 59 and 61 hereinafter referred to which together form a continuous screen at the front of the intake and the water flows through the vertical series of screens on the front and rear runs of this endless chain.

The side members 31 are slidably mounted in vertical slots 1$^b$ in the side walls 1$^a$, so as to retain the screen in position, but the whole may be bodily removed if desired, for repairs or inspection, by lifting the bars 31 vertically. This may be accomplished by means of links 5 pivotally attached to the upper ends of the bars 31, and connected by a cross-rod 6, which rod may be withdrawn if desired when the screen is in operative position.

In front of the screen and across the bottom of the intake is a bar 7 to which may be attached a metal strip 8, the upper end of which projects inwardly toward the lower end of the screen. To the upper edge of bar 8 is preferably hingedly attached a strip 9, preferably of fiber or flexible material, the upper edge of which is adapted to impinge against the front face of the screen members, as indicated in Fig. 2, and thus prevent fish, or floatage passing under the screen. The force of the water current passing through the intake keeps member 9 yieldingly pressed against the screening members. At each side of the screen may be attached metallic or other plates 9$^z$ which make a close yielding contact with the ends of the screen sections at the front side of the series and prevent fish or floatage passing around the ends of said sections.

To one of the sprockets 28$^a$ on the upper shaft 20 is attached an internal ratchet 26$^a$, (Fig. 3) which is adapted to be engaged by a pawl 24 slidably mounted upon the shaft 20 and normally held in engagement with the teeth of the ratchet 26$^a$ by means of a spring 25 attached to the heel of said pawl and to a pin on a lever 19, the tooth of pawl 24 projecting through an opening in a lateral bend in the lever 19, as indicated in Fig. 4. Said lever is operated by a water wheel hereinafter referred to, and is vibrated up and down and oscillates pawl 24 so as to cause said pawl when engaged with ratchet 26$^a$ to impart a step by step movement to the shaft 20 and thus to the endless series of screening members. The pawl 24 may be thrown into or out of operative position as hereinafter described.

The water wheel 23 may be of any suitable construction and is mounted upon a shaft 22 journaled in suitable bearings in the sides 1$^a$ of the intake and is rotated by the flow of the water in the usual manner.

The shaft 22 has a crank arm carrying a roller 21 which engages a slotted end of the lever 19 and imparts a swinging motion to said lever as the shaft 22 rotates.

As shown an internal ratchet 26 is attached to the other sprocket 28 on the upper shaft 20, and this ratchet 26 is engaged by a pawl 34 (Figs. 2 and 5) which is pivoted on a lever 33 that is pivoted in turn on shaft 20.

The pawl 34 is held yieldingly in contact with the ratchet 26 by means of a spring 35 Fig. 5. The outer end of lever 33 is pivotally connected to one end of a link 36 the other end of which is connected to a crank pin 38 on a gear wheel 37. This gear wheel 37 may be driven by a suitable motor (an electric motor being preferred) as indicated at M in Fig. 5. This gear 37 may be driven clockwise or counter-clockwise but in any case it will impart reciprocatory motion to the lever 33 and this through pawl 34 will impart a step by step rotation to the shaft 20 to operate the screen independently of the water wheel if desired.

The screening and separating sections 59 and 61, hereinafter more specifically described, form important features of the present invention, and it will be seen that these sections form a practically continuous screen preventing the passage of fish or floatage into the front end of the intake; and any matters which are caught by such sections and carried up and over the sprockets 28 and 28$^a$ will be dropped onto a debris remover and discharged.

This debris remover preferably comprises upper and lower shafts 41 and 44 rotatably mounted in a frame having side bars 45 which may be supported or pivoted upon a cross shaft 45$^a$ that is mounted in adjustable uprights 53$^a$. On the shafts 41 and 44 are mounted sprockets 48, and 46, over which run endless sprocket chains 47 which carry buckets 42$^a$ that are adapted to receive matters brought over by the screen sections, and carry the same up and over sprockets 48 and deliver same into a receptacle 52. The shaft 41 is also provided with a toothed wheel 50, Fig. 1, which operates in connection with the dog 51 which is flexibly attached to the link 55 which prevents the carrier running backward.

The transverse elevator buckets or carriers 42$^a$ are preferably composed of metal strips bent into U-shape one of the side flanges being preferably longer than the others and the bottom perforated as shown. This novel construction of the buckets causes them to retain any debris until it is carried over the top sprockets 48, when it is discharged into the receptacle 52.

On the shaft 37$^a$ on which gear 38 is mounted, is a crank 39 to which is pivotally connected one end of a link 40 (Figs. 1 and 10); the other end of which is pivotally connected to a lever 44 loosely hung on one end of the shaft 41 and carrying a pawl 44$^c$ which is held yieldingly in engagement with a ratchet 49, (Figs. 1 and 10) by a suitable spring so that as lever 44 is oscillated an intermittent motion will be imparted to shaft 41 and the debris elevator operated in a direction to raise the debris and cause it to be discharged over the shaft 41 into the receptacle 52.

The elevator may also be driven from the water wheel 23 by means of a crank arm 22$^c$ attached to one end of the shaft 22 and pivotally connected to one end of a link 43, (Fig. 10) the other end of which is pivotally connected to one end of an arm 44$^a$ attached to disk 44$^x$ loosely pivoted on shaft 41 and carrying a spring actuated pawl 44$^d$ adapted to engage a ratchet 49$^a$ on shaft 41, so that as the water wheel is rotated a slow intermittent movement will be imparted to the debris elevator 42.

The uprights 53$^a$ which support frame 45 retain the latter in proper position and may be connected at their upper ends by a cross bar 54 which enables said members to be raised or lowered simultaneously. Links 55$^a$ are adjustably connected to the uprights 53$^a$ and to the upper end of frame 45, and by adjusting these links the inclination of the debris elevator can be varied.

The receptacle 52 may be pivotally supported upon and between side bars 56$^a$ which may be connected to the shaft 45$^a$ at their inner ends, and their outer ends may be connected by links 57 to the upper ends of the bars 45 (see Fig. 2). When the receptacle 52 is in lowered position (Fig. 2) its inner end may be supported on a rod 58 which may be engaged with any of a series of notches 58$^a$ in the bars 56$^a$, which enables the receptacle to be set at any desired inclination.

Ground bars or channel irons 11 and 11$^a$ may be attached to the front end of the intake to receive boards (not shown) to shut off the flow of water through the screen at the front. Similar grooved bars 12 and 12$^a$ may be provided at rear for the same purpose; this permits isolation of any one unit of a battery of like apparatuses, where more than one is used at the same point, without interfering with the others.

Preferably in front of the screen I arrange a float 14 which may be guided on a rod 13, and which is adjustably connected to the arm 15 of a bell crank lever by means of a perforated strap 16, any one of the perforations of which may be connected with the arm 15 by means of a bolt 16$^a$, Fig. 2. Lever 15 is pivoted at 15$^a$ to the side wall, or other suitable support, and on this pivot 15$^a$ may also be pivoted a lever 18 which may be fast to the other arm of lever 15 so as to swing therewith.

To the upper end of lever 18 is pivotally connected an arm 69 which may form part of an electric switch, and as shown carries contacts $a$, $b$ on its opposite sides which are adapted on one movement or position of the lever 18 to make electric connection with contacts $a'$, $b'$, on an adjacent member 69$^a$; but on the other movement, or position, of the lever 18 will separate such contacts. This makes practically a double pole switch, and such switch may be of any suitable construction, provided that it can be operated by lever 18 so that in one position of the float (i. e. when the float is elevated) the circuit will be closed between contacts $a$, $a'$ and $b$, $b'$, and in another position of the switch the circuit will be broken between such contacts.

The contacts $a$, $b$ may be connected by suitable wires to the opposite poles of a suitable source of electricity (not shown) while the contacts $a'$, $b'$ may be connected by suitable wires to the poles of the electric motor M which operates the gear 37.

Pivotally connected to the arm 15 is a link 17 (Figs. 3 and 4) the other end of which is slotted over to and supported by the shaft 20. The link 17 has a lug 17$^a$ which engages within the opening in pawl 24, see Fig. 4, and if the float descends so as to rock lever 15 and draw bar 17 outward the bar will also disengage the teeth of the pawl 24 from the ratchet 26 and when thus withdrawn the lever 19 will no longer effectively operate the ratchet 26$^a$ or the screen driving mechanism.

The elevator or screen may be operated from the water wheel; or each may be operated independently of the water wheel through the motor driven gear 37 and connections. Owing to the variable conditions at the head of the ditches, canals, pipelines, etc., it is not possible to always operate the devices with one kind of power alone. At some points of diversion in the high mountains electric power is not available; at other points in the lowlands there is not sufficient grade in the canals to operate a water wheel drive.

The upper end of lever 18 may be pivotally connected to one end of a link 70 the other end of which is pivotally connected to a lever 71 pivotally mounted on the shaft 41, at the end opposite arm 44.

Lever 71 has a parti-cylindric head or flange 71ˣ on its upper end which when the lever is in one position will keep pawl 44ᵈ out of engagement with ratchet 49ᵃ. The starting and stopping of the motor is caused through the make and break of the switch operated by the float. When lever 18 is moved to cut out the pawl 24 the link 70 oscillates lever 71 which causes finger 71ˣ to disengage pawl 44ᵈ from ratchet 49ᵃ and this prevents the waterwheel operating the shaft 41 or debris remover.

The shaft 22 which carries the water wheel is the main driving member, as it will rotate the screen assembly also the debris remover, whenever said shaft is driven by water power, electric power, gas or other means. The shaft 22 may be driven in either direction, while the driven members will always rotate in a clockwise direction.

Another feature of importance is the novel screen sections. Instead of the usual method of "tie rod and ferrule" assembly of the bars, I employ novel means for locking the horizontal bars in position by means of thin wedge shaped metal crossties, thereby securing added water clearance between the bars, and a further reduction in cost of material and construction. The screen sections 59 are preferably composed of a rectangular metallic frame formed of upper and lower metal bars 59ᵃ and 62, (Figs. 6–8) whose sides are preferably flanged, as shown, by turning the metal over upon itself to stiffen the bars. These bars are connected by end plates 59ᵇ as indicated. Within these frames are arranged a series of horizontal bars 59ᶜ which may be composed of metal strips having their front edges bent upon themselves as indicated at 59ᵉ; and these bars 59ᶜ are locked into the frame 59—62 and held in proper spaces by means of thin wedge shaped metal strips or crossties 64 which are driven through the side members of frame and bars from alternate sides as shown in Figs. 6—7—8. The turning down of the two ends of the crossties 64 against the side members of the frame (Fig. 7) completes the assembly of the screening section, which, when completed, is light, rigid, and of maximum efficiency.

I can construct the horizontal bars 59ᶜ of sheet metal of #30 gage; whereas usually metal of #16 gage is required. This result is obtained by flanging one edge of the bars as at 59ᵉ.

While I prefer to use screen sections of the construction described, the frame might be provided with ordinary wire-mesh indicated at 60ˣ in Fig. 9. These screen sections may be conveniently attached to the chain links by means of lugs 65 pivoted to the links, and to which the screen frames are bolted as indicated at 65ᶻ.

To secure additional rigidity and protect the metal from the destructive action of the water, the screen sections are preferably galvanized after assembling.

The automatic "cutin" and "cutout" of the driving apparatus is of importance as its use prolongs the life of the screen assembly and debris remover; also reduces the cost of operation as the driving motor and screen operate only when there is a sufficient amount of debris deposited on the face of the screen to cause the water to raise the float.

All fish screening devices are constructed in such manner that the operation of the various parts is constant. This form of construction requires the services of an attendant at the point of diversion to start or stop the power member whenever it is necessary to do so. There is no reason for rotating a fish screen in clear water, or in water that is free from all kinds of debris, and there is a wide range of difference in the amount of floatage matter that runs in open ditches during the 24 hours of the day. And as practically all ditches carry water at the intake that carries a great deal of fine sand in suspension the bearings on ordinary screens wear out quickly.

By the use of the automatic "cut out" arrangement the screening members, as well as the debris remover, can be arranged to operate only when there is floatage matter to be removed.

It should also be noted that the various parts have been so coördinated that the completed apparatus may be entirely removed without shutting off the water or disturbing the other units which may be in operation.

At the intake of pipe lines maintaining means for the collection and removal of debris, it is necessary that the device must be constructed to work under adverse conditions.

If the members were to be driven normally by the electric motor, the water wheel driving mechanism could be suspended above the water with the pitman 19 disconnected.

In case of the shutting off of the electric current the water wheel could be immediately dropped into place, the pitman 19 connected up and the entire assembly be driven by the water wheel.

On the other hand should the normal drive be the water wheel, the simple operation of disconnecting the switch would isolate the motor driven means until such time as its use might become necessary through any surden breaking down of the water wheel drive.

There is a necessity for providing more than one means of operating these screening devices; customarily workmen are usually stationed day and night at the intakes or head works with suitable instruments to remove the debris which is constantly being deposited on the face of the screen.

The condition or elevation of the water passing through the screen when the float causes the cutout is at normal, and the arm 16 connecting the float with the bell crank 15 is to be hooked up or down as desired until the float cuts out the rotation of the various parts when the desired flow of water is passing through the screen.

As soon as any perceptible amount of debris has collected on the face of the screen it will restrict the free flow of water through the same and also begin to back up the water in front of the screen.

But the rising of the water immediately raises the float which engages either of these driving mechanisms which may be in use at the time.

As soon as the floatage matter thus collected has been removed the water level again drops to normal and the float disconnects the switch which causes the various parts to come to rest if motor driven, or the same result is accomplished by the float in disconnecting the ratchet and pawl mechanism if the assembly is being driven by the water wheel.

Hydroelectric plants which divert large volumes of water from the streams must keep their ditches free from debris carried by winter storms, and where their electric lines are liable to be broken down by heavy snows it would be necessary to use the water wheel drive until such time as the electric line could be repaired.

What I claim is:

1. In a fish screen the combination of a screen, and means for actuating the same to remove debris from a water-way; with float controlled means for throwing the screen actuating means into or out of operation.

2. In a fish screen the combination of a series of screen sections arranged transversely of the water passage, and means for moving said screen sections along an endless pathway; with float controlled means for throwing the moving means into or out of operation.

3. In combination, a screen arranged transversely of the water passage, and means for operating said screen to remove debris from the water passage; with a debris remover located in rear of the screen, means for operating said debris remover, and float controlled means for throwing the operating means into or out of operation.

4. In combination, a series of screen sections arranged transversely of the water passage, and means for moving said screen sections vertically along an endless pathway; with a debris remover located in rear of the screen, means for operating the debris remover, and float controlled means for throwing the operating means into or out of operation.

5. In a fish screen the combination of a series of screen sections, and means for moving said sections in an endless path, said screen sections lying transversely of and across the water passage; with a water wheel in rear of the screen, means actuated by said water wheel for operating the screen, and float controlled means for throwing the screen operating means into or out of operation.

6. In combination, a screen, a shaft for operating the screen, a ratchet for operating said shaft, an oscillating lever, a pawl carried by said lever and engaging said ratchet, with float actuated means whereby the pawl may be thrown into or out of engagement with the ratchet, substantially as described.

7. In combination, an endless series of screening sections, a shaft for operating the series to remove debris from a water-way, a ratchet for operating said shaft, an oscillating lever, a pawl carried by said lever and engaging said ratchet, and means for oscillating said lever; with float actuated means whereby the pawl may be thrown into or out of engagement with the ratchet, substantially as described.

8. In combination, an endless series of screening sections, a shaft for operating the series, a ratchet on said shaft, an oscillating lever, a pawl carried by said lever engaging said ratchet, a water wheel and connections for oscillating said lever, and float actuated means whereby the pawl may be thrown into or out of engagement with the ratchet; with a second ratchet on said shaft, a second oscillating lever, a pawl thereon engaging said second ratchet; an electric motor for oscillating said second lever, and a switch operated by said float actuated means for throwing said motor into or out of operation.

9. A debris remover comprising an endless series of parallel trough-shaped bars slidably mounted within a frame adapted to lie transversely of the water-way, and float actuated means for operating said debris remover intermittently.

10. In combination, an endless series of screening sections, a shaft for operating said sections, a ratchet on said shaft, an oscillating lever, means carried by said lever for engaging said ratchet, a motor for oscillating said lever, and float actuated means for throwing said motor into and out of operation.

11. A fish screen comprising a metallic frame having upper and lower bars set edgewise, end pieces connecting the upper and lower bars, and a series of intermediate parallel thin blades spaced slightly apart and all arranged horizontally edgewise; and means for spacing and rigidly fastening said blades in the frame, substantially as described.

12. A fish screen section, comprising a series of parallel horizontally disposed thin blades arranged to lie transverse of and across the water passage, and transversely disposed thin wedge-shaped blades transfixing the horizontally disposed blades and spacing them apart.

13. In a fish screen the combination of a plurality of screen sections movable in an endless path, each section being composed of a series of parallel horizontally disposed thin blades rigidly connected and slightly spaced apart and lying transversely of the water passage, and transversely disposed thin wedge-shaped blades transfixing the horizontally disposed blades and spacing them apart; with means for operating the series of screens.

14. In combination, a plurality of endless chains, means for traveling such chains in an endless orbit, and screen sections detachably attached to said chains; each section comprising a series of horizontally disposed parallel thin blades, and transversely disposed thin wedge-shaped or tapered blades transfixing the horizontally disposed blades to space them apart and fasten them together.

In testimony that I claim the foregoing as my own, I affix my signature in presence of witnesses.

RALPH WALDO REQUA.

Witnesses:
G. H. TAYLOR,
C. L. CROWDER,
W. C. NOTLEY.